United States Patent [19]
Fujimoto

[11] Patent Number: 6,024,132
[45] Date of Patent: Feb. 15, 2000

[54] FLEXIBLE HOSES

[75] Inventor: Noriaki Fujimoto, Kobe, Japan

[73] Assignee: Tigers Polymer Corporation, Osaka, Japan

[21] Appl. No.: 09/190,849

[22] Filed: Nov. 12, 1998

[30] Foreign Application Priority Data

Nov. 19, 1997 [JP] Japan ................................. 9-317995

[51] Int. Cl.$^7$ ............................. F16L 11/11; F16L 11/12; F16L 11/00
[52] U.S. Cl. ........................... 138/122; 138/121; 138/118
[58] Field of Search ..................................... 138/119, 121, 138/122, 124, 125, 118, 140, 141, 173

[56] References Cited

U.S. PATENT DOCUMENTS

| | | | |
|---|---|---|---|
| 3,572,393 | 3/1971 | Eisert | 138/121 |
| 5,485,870 | 1/1996 | Kraik | 138/121 |
| 5,555,915 | 9/1996 | Kanao | 138/122 |

FOREIGN PATENT DOCUMENTS

| | | |
|---|---|---|
| 4312040 | 5/1943 | Japan . |
| 07265237 | 10/1995 | Japan . |

*Primary Examiner*—Andres Kashnikow
*Assistant Examiner*—Davis Hwu
*Attorney, Agent, or Firm*—Pillsbury Madison & Sutro LLP

[57] ABSTRACT

The flexible hose comprises a bellows hose wall 1 composed of an inner wall 2 and an outer wall 3 each made of a soft resin and a spiral hard reinforcement 4 interposed therebetween. As the hose contracts, a spiral groove 7 is formed inside of the hose. The inner wall 2 is not partially bonded or fused with the outer wall 3 and the hard spiral reinforcement 4 to form unbonded sites or fragments 8. As the hose contracts, the unbonded fragments 8 are separated from the outer wall 3 and the spiral hard enforcement 4 and move to the inward direction of the hose, and close the spiral groove 7. Therefore, even a fluid flows to any longitudinal direction, the flexible hose reduces a flow resistance.

2 Claims, 3 Drawing Sheets

FLEXIBLE HOSES

FIELD OF THE INVENTION

The present invention relates to a flexible hose having a small pressure loss which is useful as a hose for an electric cleaner, an electric washing machine and so on.

BACKGROUND OF THE INVENTION

As a flexible hose for connecting to, e.g., an electric cleaner, there has been known a bellows hose whose hose wall is constituted of spiral concaves and convexes throughout its length. However, when the hose is attached to an electric cleaner or the like and the cleaner is operated, such spiral concaves and convexes formed inside the hose result in a great pressure loss and high suction resistance, and deteriorate the suction performance of the hose.

Japanese Patent Application Laid-Open No. 265237/1995 (JP-A-7-265237) discloses a cleaner hose wherein a reinforcing wire is spirally wound. In this reference, at least one end of the hose is formed such that the turns of the spirally wound reinforcement are tightly adjoining or adjacent each other at a steep angle with the hose wall between the turns inwardly folded (an expandable and contractible zone or region of the required length), and other part of the hose is formed such that, in its normal state with the hose wall stretched, the turns of the spirally wound reinforcement are apart from each other in the axial direction of the hose at a gentle angle. Since the expansion and contraction zone or region is expansible, contractible and bendable, such cleaner hose is easier to handle and has a reduced ventilation resistance in the middle region of the hose. When the hose is in a state of contraction, however, the ventilation resistance can not be reduced to a great extent due to the inwardly extending folded hose wall between the turns of the reinforcing wire.

Japanese Patent Publication No. 12040/1968 (JP-B-43-12040) discloses the method for producing a compressible hose, which comprises folding the hose wall inwardly to form a fold between the adjoining turns of the wire reinforcement, thrusting a core mold into the hose to make the folds incline in the same direction, and bending or curving the wall of the folds. When the direction of the inclination and the direction of the flow of a fluid are the same, it is possible to reduce the flow resistance of a hose obtained by this method. However, when a fluid flows from the direction opposite to the direction of the inclination of the folds, flow resistance increases significantly. As a result, electricity is highly consumed, hence economically disadvantageous. Furthermore, depending on the structure of a hose, the folds inside the hose sometimes can not be inclined, and applications of the hose are limited.

In particular, when a hard steel wire and a copper wire are disposed in parallel and used as a spiral reinforcement, a spiral groove inside the hose is widened with contraction of the hose, and the widened groove renders it difficult to reduce the ventilation resistance of the hose which is in a state of contraction.

SUMMARY OF THE INVENTION

It is, therefore, an object of the present invention to provide a flexible hose having a low flow resistance irrespective of the direction a fluid flows from.

It is another object of the present invention to provide a flexible hose having a simple structure that permits a significant reduction in flow resistance even if a wide spiral groove is formed inside the hose as the hose contracts.

The inventor of the present invention did intensive investigation to achieve the above objects, and found that, in a bellows hose comprising a hose wall and a spiral reinforcement, even if a wide spiral groove is formed as the hose contracts, the spiral groove can be closed up with an unbonded tape member formed by separating a tape member constituting an inner wall of the hose wall from an outer wall and the reinforcement at a specific or predetermined position. The present invention is based on the above finding.

The flexible hose of the present invention is an expansible and contractible hose composed of a bellows hose wall comprising an inner wall and an outer wall each made of a soft resin, and a spiral hard reinforcement interposed therebetween to form a spiral groove inside the hose. Predetermined sites of the inner wall are not bonded or fused with the outer wall and the spiral hard reinforcement to form unbonded sites and, as the hose contracts, the unbonded sites move in the inward direction and close the spiral groove.

In such flexible hose, since the inner wall has the unbonded sites (separable sites) separating from the outer wall and the hard spiral reinforcement, as the hose contracts, the unbonded sites of the inner wall move in the inward direction and close the spiral groove. Moreover, when the tape constituting the inner wall of the hose are bonded or fused with the outer wall and the reinforcement at specific sites and other sites of the tape are left bonded to form unbonded sites, the unbonded sites of the inner wall form folded slackness or sag movable in the inward direction of the hose as the hose contracts, and such folded slackness or sag insure the closing of the spiral groove.

DETAILED DESCRIPTION OF THE INVENTION

Figure 1:
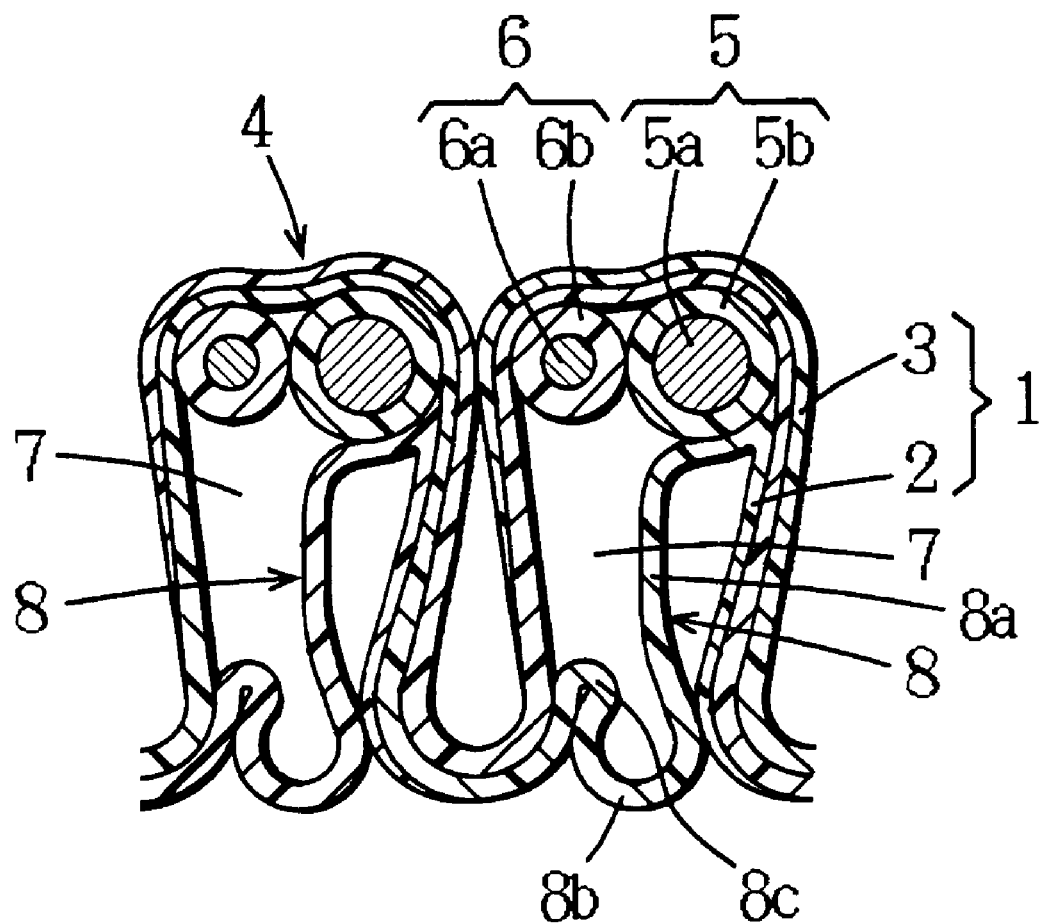
FIG. 1 is a schematic sectional view showing one embodiment of the flexible hose of the present invention.
Figure 2:
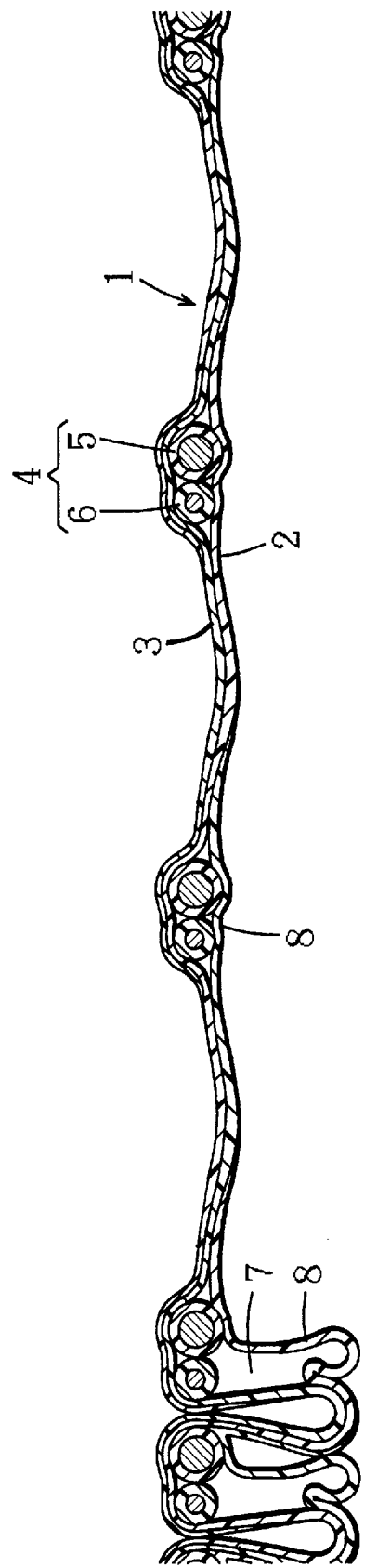
FIG. 2 is a schematic sectional view showing the flexible hose of FIG. 1 in a state of expansion.
Figure 3:
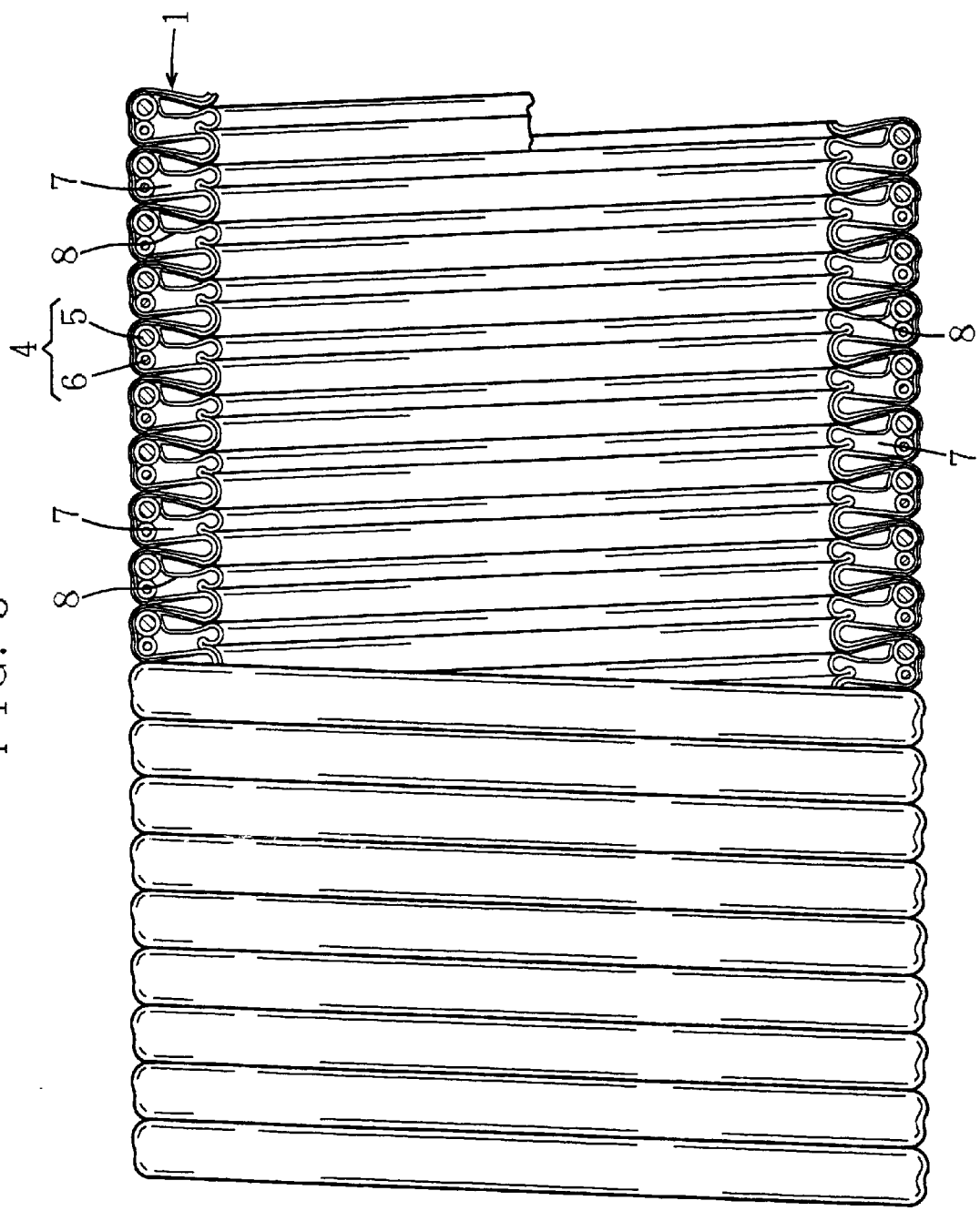
FIG. 3 is a partially fragmentary view of the flexible hose of FIG. 1.

FIG. 1 is a schematic sectional view showing one embodiment of the flexible hose of the present invention, FIG. 2 is a schematic sectional view showing a lenghthen flexible hose of FIG. 1, and FIG. 3 is a partially fragmentary sectional view of the flexible hose of FIG. 1.

A bellows flexible hose is composed of a hose wall 1 comprising an inner wall 2 and an outer wall 3, and a spiral reinforcement 4 interposed between the inner wall 2 and the outer wall 3. As shown in FIG. 1 and FIG. 2, each of the inner and outer walls 2 and 3 is respectively formed by spirally winding a soft and wide tape with overlapping its sides. The tape may be made of a soft or flexible synthetic resin such as a polyethylene, an ethylene-vinyl acetate copolymer, an ethylene-propylene copolymer and a soft (or non-plasticized) polyvinyl chloride resin.

The spiral reinforcement 4 is spirally wound in the axial direction of the hose at a single pitch and has a two-wire structure. In other words, the spiral reinforcement 4 comprises a spiral reinforcing wire 5 and a covered spiral conductor (or conductive wire) 6 adjoining parallel to the reinforcing wire 5. The spiral reinforcing wire 5 is composed of a hard steel wire 5a and a soft synthetic resin layer 5b covering the hard steel wire 5a. The covered conductor 6 is composed of a copper wire 6a as a core wire and a synthetic resin layer 6b covering the copper wire.

As the flexible hose contracts, a spiral groove 7 is formed inside the flexible hose. Particularly, since the spiral reinforcement 4 has a two-wire structure in which the reinforcing wire 5 and the conductor 6 are disposed in parallel, a wide spiral groove 7 is formed with the hose contraction, and consequently, the pressure loss and the flow resistance of a fluid increase. According to the present invention, with the hose contraction, even such wide spiral groove 7 can be closed up effectively.

That is to say, the soft tape constituting the outer wall 3 of the hose wall 1 is united with the reinforcement 4 (the reinforcing wire 5 and the covered conductor 6) by bonding or fusing, and the inner wall 2 forms an unbonded site or fragment 8 at which the inner tape is separable from the outer wall 3 and the spiral reinforcement 4. As the hose contracts, the unbonded site or fragment moves inward and closes the spiral groove 7. To be specific, the tape constituting the inner wall 2 of the hose is bonded or fused with the entire one side surface of the folded outer wall surfaces facing or opposing to each other, and a part of the reinforcement 4 within the spiral groove 7, and also with the other surface of the folded outer wall at the opening side of the spiral groove 7. The unbonded site 8 at which the tape is separable from the outer wall 3 and the spiral hard reinforcement 4 forms a folded slackness or sag (separated fragment). Further, when the hose is in a state of contraction, the slackness or sag (separated fragment) corresponding to each unbonded site of the tape comprises tree units, i.e., a hanging or pendulous unit 8a hanging from the end of the area bonded or fused with the reinforcement 4, a constriction unit 8c extending from the end of the bonded or fused area at the opening side of the spiral groove 7 toward the inside of the spiral groove 7 and folded or turned back or reversely (toward the outside of the spiral groove), and a curving unit 8b between the hanging unit 8a and the constriction unit 8c.

In such flexible hose, when the hose contracts with the shrinkage force of the reinforcement 4 for regaining its original position, the folded slackened or sag fragment constituted of the unbonded site 8 movable in the inward direction of the hose closes up the opening of the spiral groove 7. Therefore, even if the hose is in a contraction state, flow resistance can be significantly reduced.

The tape constituting the inner wall of the hose need only have an unbonded site or fragment separable from the outer wall and/or the spiral hard reinforcement and with which the spiral groove is closed. Usually, the tape for the inner wall comprises a bonded or fused site bonding with inner one side surface of the folded outer wall constituting the spiral groove, and an unbonded site which forms a separable fragment or a slackness or sag on contraction of the hose and which leaves the other site or region of the tape unbonded with the outer wall and the spiral reinforcement. In particular, in order to insure the closing of the spiral groove on contraction of the hose, an unbonded fragment (a separable fragment) hanging down from at least the upper part of the inner surface of the outer wall surfaces facing each other in the spiral groove is formed inside the spiral groove.

Furthermore, preferably, the tape for the inner wall is bonded or fused with one side surface of the folded outer wall surfaces that face or opposite to each other on contraction of the hose, and also with the other side surface of the folded outer wall at the opening side of the spiral groove to form an unbonded site being separable from the outer wall and the spiral hard reinforcement. Particularly, when an unbonded site (slack) is formed so as to have a constriction unit extending toward the inside of the spiral groove and folded back, a curving unit or segment for closing the spiral groove can be formed between the hanging unit and the turned constriction unit.

The unbonded site or fragment need only be formed on at least a part of the hose wall, and all or a part of the hose may be provided with the unbonded site or fragment. For example, the unbonded fragments may be formed in an area excluding at least one end of the hose which forms an attachment section or member to an electric cleaner and so on. Further, at least one end portion of the hose may be formed as a non-bellows-formed attachment section (a cylindrical attachment portion). To the attachment section may be fixed a terminal conducting to the conductor.

The spiral reinforcement need not be composed of a plurality of reinforcing members, and may be a single reinforcing member. Further, the spiral reinforcement need only be constituted of a spiral hard reinforcement, and not only the metal wire (e.g., a steel wire, a piano wire, a stainless steel wire) but also a reinforcement comprising a hard resin may be used. The hard metal wire may be coated with a conductive material (e.g., copper, silver, aluminum). Depending on the application of the hose, it is unnecessary to provide the hose with a conductor for transmitting electric signals to a device. Examples of the hard resin are hard (or non-plasticized) polyvinyl chloride resins, (meth)acrylic resins, polycarbonate resins and polyamide resins. The reinforcement may be spirally wound at a suitable pitch (e.g., single pitch, double pitch, and triple pitch).

The inner and outer walls constituting the hose wall may be formed with one wide tape or a plurality of tapes (e.g., an inner tape and an outer tape).

The tape constituting the inner wall can be bonded or fused with the outer wall or the spiral reinforcement by various means such as heat fusion or welding and adhesion with an adhesive.

A flexible hose having the above-described structure can be produced by various methods, e.g., a method which comprises applying an adhesive to adhesion or bonding areas, without non-adhesion areas, of a wide tape for the inner wall and/or the outer wall with sandwiching a spiral reinforcement between the inner tape and the outer tape, and winding the wide tapes with overlapping the respective tapes at the both side edges.

Whichever longitudinal direction a fluid flows from, the flexible hose of the present invention has a small flow resistance. Therefore, it has many applications and may be used as a hose for an electric cleaner or an electric washing machine, or a hose or a duct for an air conditioner and the like.

Since the unbonded site or fragment of the tape constituting the inner wall closes the spiral groove with the contraction of the hose, even a fluid flows to any longitudinal direction, the flexible hose of the present invention reduces a flow resistance. Moreover, even if the spiral groove is wide, flow resistance can be significantly reduced by simply forming unbonded sites or fragments.

What is claimed is:

1. A contractible and expandable flexible hose comprising a bellows hose wall composed of an inner wall and an outer wall each made of a soft resin, and a spiral hard reinforcement interposed therebetween to form a spiral groove inside the hose, the inner wall forms an unbonded site which is not bonded or fused with the outer wall and the hard spiral reinforcement, and the unbonded site moves in the inward direction of the hose as the hose contracts and close the spiral groove.

2. The flexible hose according to claim 1, wherein said inner and outer walls are respectively formed with a tape, the tape forming the inner wall is bonded or fused with one of the outer wall which constitutes said spiral groove on contraction of the hose and also with the opposite other outer wall at the opening side of the spiral groove, and an unbonded site of the tape is separable from the outer wall and the spiral hard reinforcement to form the unbonded fragment.

* * * * *